(12) United States Patent
Campbell et al.

(10) Patent No.: US 11,754,454 B2
(45) Date of Patent: Sep. 12, 2023

(54) PIEZOELECTRIC STRAIN SENSOR UNIT FOR A ROLLING BEARING

(71) Applicant: Aktiebolaget SKF, Gothenburg (SE)

(72) Inventors: Andrew Campbell, East Kilbride (GB); Hans Soetens, Hilvarenbeek (NL); Allan Thomson, Lanark (GB)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 18/115,894

(22) Filed: Mar. 1, 2023

(65) Prior Publication Data

US 2023/0204444 A1 Jun. 29, 2023

Related U.S. Application Data

(63) Continuation of application No. 17/241,280, filed on Apr. 27, 2021, now Pat. No. 11,644,373.

(30) Foreign Application Priority Data

May 25, 2020 (DE) .......................... 102020206480.6

(51) Int. Cl.
*G01L 5/167* (2020.01)
*G01L 1/16* (2006.01)
*G01L 5/22* (2006.01)

(52) U.S. Cl.
CPC ................. *G01L 5/167* (2013.01); *G01L 1/16* (2013.01); *G01L 5/228* (2013.01)

(58) Field of Classification Search
CPC ............ G01L 5/167; G01L 1/16; G01L 5/228
See application file for complete search history.

(56) References Cited

U.S. PATENT DOCUMENTS

| 8,261,421 | B2 * | 9/2012 | Monville | B23P 19/067 |
| | | | | 29/446 |
| 10,082,178 | B2 * | 9/2018 | Dop | F16C 33/34 |
| 10,539,477 | B2 | 1/2020 | Erskine | |
| 11,644,373 | B2 * | 5/2023 | Campbell | G01L 5/167 |
| | | | | 73/774 |

FOREIGN PATENT DOCUMENTS

| CN | 2529231 Y | 1/2003 | |
| CN | 205280329 U | 6/2016 | |
| JP | 2018063113 A | 4/2018 | |
| JP | 2019056654 A | 4/2019 | |
| RU | 206443 U1 * | 9/2021 | ............... G01L 5/24 |
| WO | 2014101983 A1 | 7/2014 | |

* cited by examiner

*Primary Examiner* — Octavia Davis Hollington
(74) *Attorney, Agent, or Firm* — GARCIA-ZAMOR INTELLECTUAL PROPERTY LAW, LLC; Ruy Garcia-Zamor

(57) ABSTRACT

A piezoelectric strain sensor unit for a rolling bearing includes a piezoelectric strain sensor, and a sensor holder provided with a main body having a front face intended to be into contact with a component of the rolling bearing and a rear face, and with at least two flexible arms mounted on the main body and supporting opposite ends of the piezoelectric strain sensor, the piezoelectric strain sensor being axially located on the side of the rear face of the main body while remaining spaced apart from the rear face. The sensor holder is provided with a central pin which protrudes axially with regard to the front face of the main body and which is axially moveable with regard the main body, the central pin axially abutting onto the piezoelectric strain sensor.

Figure 1:
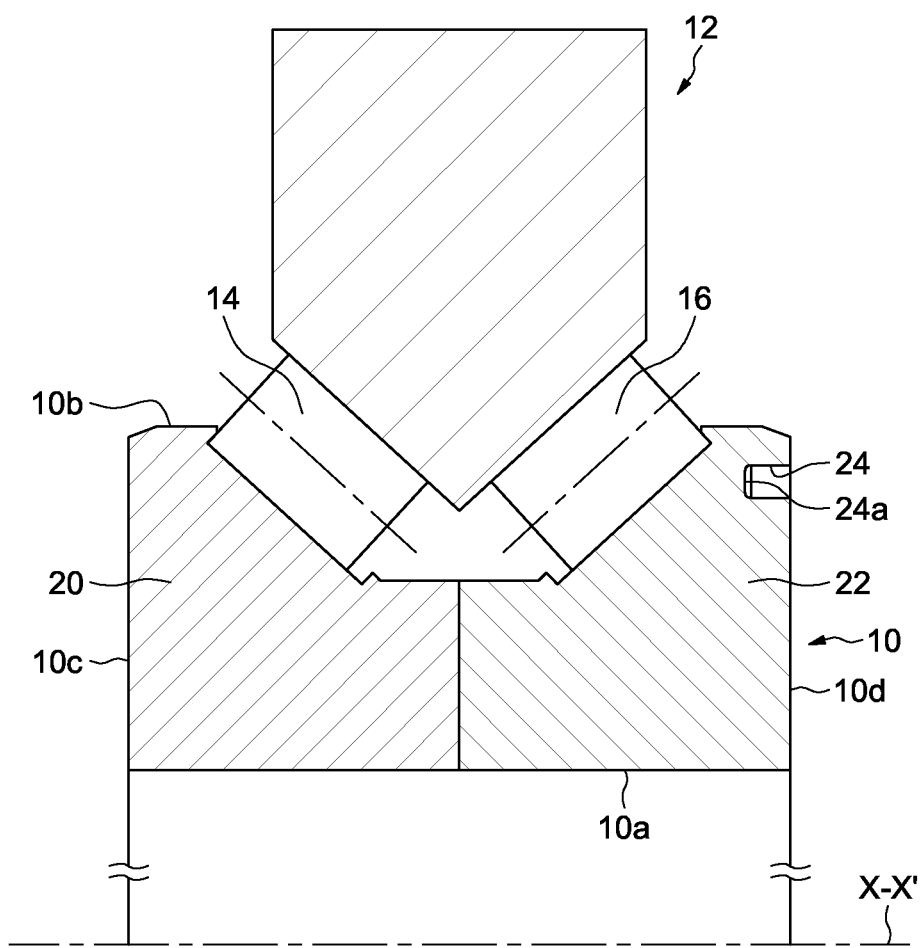

20 Claims, 3 Drawing Sheets

PIEZOELECTRIC STRAIN SENSOR UNIT FOR A ROLLING BEARING

CROSS-REFERENCE TO RELATED APPLICATIONS

This application claims priority to the following patent applications: (1) U.S. patent application Ser. No. 17/241,280, filed Apr. 27, 2021; and (2) German Patent Application no. 102020206480.6, filed May 25, 2020; each of which is hereby incorporated by reference in its entirety as if fully set forth herein.

TECHNICAL FIELD

The present invention concerns condition monitoring of rolling bearings more particularly directed to rolling bearings with rollers, such as cylindrical rollers.

BACKGROUND OF THE INVENTION

A rolling bearing typically includes an inner ring, an outer ring and at least one row of rolling elements radially disposed between these two inner and outer rings. The rolling elements may be rollers or needles. The rolling bearing may be a spherical roller bearing (SRB), a tapered roller bearing (TRB), or a toroidal roller bearing (CARB). Alternatively, the rolling elements may be balls.

In the field of rolling element bearings, it is known to attach one or more sensors to measure one or more physical parameters and transduce these physical parameters into electrical signals. One such example is the use of a load or strain sensor in order to determine a load that rolling elements are subjected to in a loaded zone. This can be done to determine a load a machine is subjected to. Determining a load that a bearing is subjected to can also be done for the purpose of determining past and current operating conditions and predict future reliability.

Classically, such strain sensor is permanently bonded to the surface of rolling bearing being measured and cannot be replaced in service.

One aim of the present invention is to overcome this drawback.

SUMMARY OF THE INVENTION

The invention relates to a piezoelectric strain sensor unit for a rolling bearing having a piezoelectric strain sensor, and a sensor holder provided with a main body having a front face intended to be into contact with a component of the rolling bearing and a rear face, and with at least two flexible arms mounted on the main body and supporting opposite ends of the piezoelectric strain sensor. The piezoelectric strain sensor is axially located on the side of the rear face of the main body while remaining spaced apart from the rear face.

According to a general feature, the sensor holder is further provided with a central pin which protrudes axially with regard to the front face of the main body and which is axially moveable with regard the main body. The central pin axially abuts onto the piezoelectric strain sensor.

Thanks to the invention, the method to measure deformation is a three points bending measurement method. The piezoelectric strain sensor will bend in response to an axial movement of the central pin of the sensor holder, and give a signal which indicates a value for dynamic deformation.

Both ends of the piezoelectric strain sensor are flexible supported by the flexible arms of the sensor holder. This reduces the parasitic stress in the piezoelectric strain sensor, which give that forces introduced by temperature do not influence the measurement. This results in a very repeatable measurement. The flexible arms act as leaf springs.

Preferably, the front face of the main body is provided with at least three feet to position the sensor holder into contact with the component of the rolling bearing. This also contributes to a repeatable measurement.

Advantageously, the bending stiffness of the flexible arms of the sensor holder is smaller than the bending stiffness of the piezoelectric strain sensor. This leads to realize a big as possible measurement result.

Preferably, the central pin axially abuts in the middle of the piezoelectric strain sensor. The piezoelectric strain sensor may lie in a plane parallel to the front face of the main body.

In one embodiment, each flexible arm is provided with an axial part mounted on the main body and flexible in the radial direction, and with a radial part extending the axial part and flexible in the axial direction. The radial part of each flexible arm may extend from the axial part at an angle of 90 degrees.

In one embodiment, the main body, the flexible arms and the central pin of the sensor holder are made into one part. This makes the sensor holder unsensitive to temperature changes.

In one embodiment, the piezoelectric strain sensor unit further comprises an outer shell secured to the main body of the sensor holder and delimiting together with the main body a closed chamber inside which is located a pre-stressing element, the pre-stressing element exerting an axial force on the piezoelectric strain sensor so as to ensure an axial contact between the strain sensor and the central pin. The piezoelectric strain sensor unit may further comprise a connector sleeve connected to the outer shell and flexible bellows axially interposed between the connector sleeve and the outer shell.

The invention also relates to a rolling bearing comprising an inner ring, an outer ring and at least one row of rolling elements interposed between raceways of the inner and outer rings, one of the inner and outer rings comprising at least one piezoelectric strain sensor unit as previously defined. The main body of the sensor holder of the strain sensor unit comes into contact against a flat surface of the ring.

In one embodiment, the ring comprises at least one blind hole made into the thickness of the ring. The main body of the sensor holder of the strain sensor unit comes into contact against the flat bottom of the blind hole. The blind hole may extend from a radial side face or from an axial surface of the ring.

Alternatively, the main body of the sensor holder of the strain sensor unit may come into contact against one of the side faces of the ring.

DESCRIPTION OF THE ACCOMPANYING DRAWINGS

Figure 2:
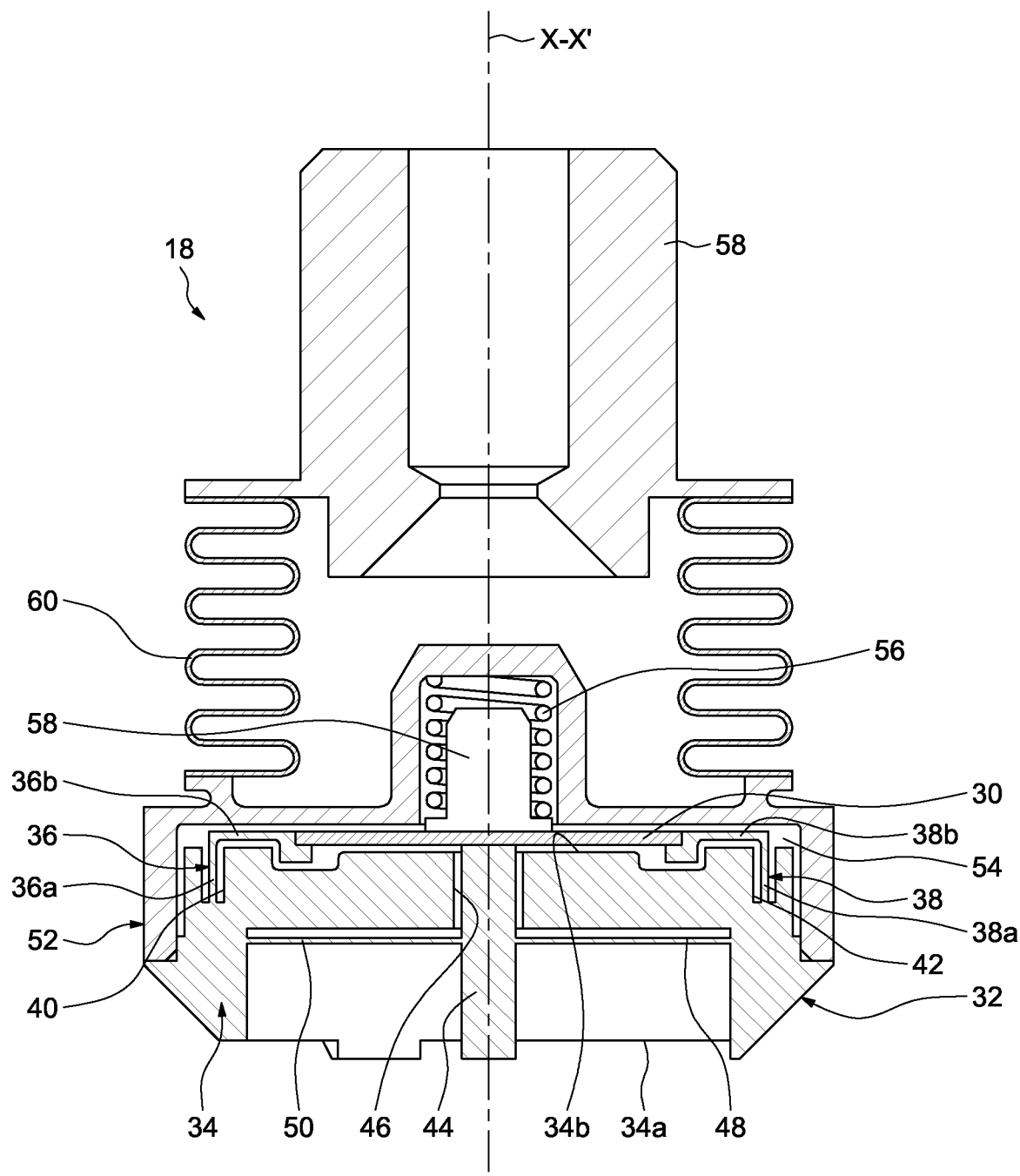
Figure 3:
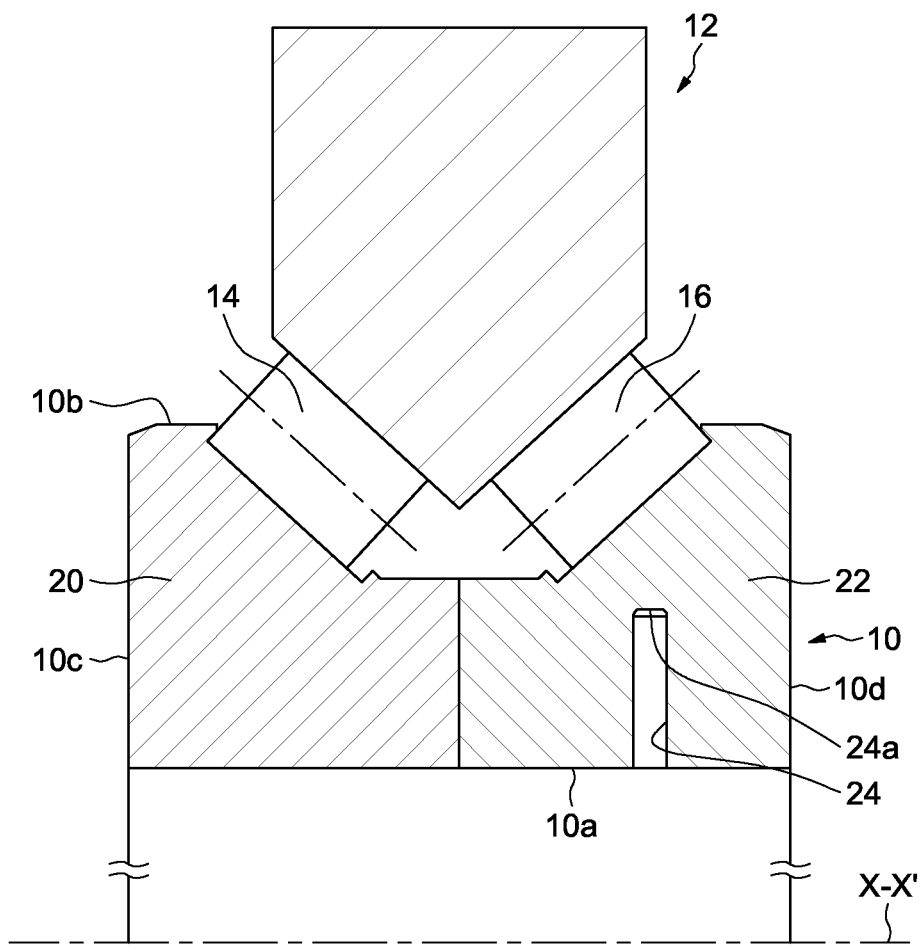

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings:

FIG. 1 is a cross-section of a rolling bearing according to a first example of the invention, FIG. 2 is a piezoelectric strain sensor unit of the rolling bearing of FIG. 1, and FIG. 3 is a cross-section of a rolling bearing according to a second example of the invention.

DETAILED DESCRIPTION OF THE INVENTION

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the invention. The terms "downward" and "upward" refers to directions above and below the referenced component, respectively, unless specified otherwise. Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C'; —and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

The rolling bearing as illustrated on FIG. 1 comprising an inner ring 10, an outer ring 12, and two row of rolling elements 14 and 16, which are provided here in the form of rollers, mounted between the inner and outer rings.

As will be described later, in the illustrated example, the rolling bearing further is equipped with a piezoelectric strain sensor unit 18 (FIG. 2) mounted on the inner ring 10 to enable measuring load of the rolling elements 16.

The inner and outer rings 10, 12 are concentric and extend axially along the bearing rotation axis X-X' which runs in an axial direction. The rings 10, 12 are of the solid type.

The inner ring 10 is formed as a split ring and comprises a first part 20 and a second part 22 stacked one relative to the other in the axial direction. The inner ring 10 comprises a cylindrical bore 10a and an opposite outer cylindrical surface 10b from which annular raceways (not referenced) for the rolling elements 14, 16 are formed, the raceways being directed radially outwards.

The inner ring 10 further comprises two opposite radial side faces 10c, 10d which axially delimit the bore 10a and the outer surface 10b of the ring. The lateral faces 10c, 10d delimits the axial thickness of the inner ring 10. As previously mentioned, the inner ring 10 is divided in the axial direction in two separate parts, the first part 20 and the second part 22. The first part 20 delimits the lateral face 10c while the second part 22 delimits the lateral face 10d.

The inner ring 10 is provided with a blind hole 24 extending axially from the side face 10d. The blind hole 24 is oriented axially outwards. The blind hole 24 extends axially in the thickness of the inner ring 10. The blind hole 24 is provided with a flat bottom 24a. In the illustrated example, the bottom 24a extends radially.

As shown on FIG. 2, the piezoelectric strain sensor unit 18 comprises a piezoelectric strain sensor 30 and a sensor holder 32 supporting the strain sensor. The piezoelectric strain sensor unit 18 extends along a longitudinal axis X-X'.

The piezoelectric strain sensor 30 may be a piezoelectric plate or a piezoelectric beam.

The sensor holder 32 comprises a main body 34 having a front face 34a mounted into contact with the bottom 24a (FIG. 1) of the blind hole of the inner ring, and an opposite rear face 34b. The main body 34 is delimited by the front and rear faces 34a, 34b in the axial direction with respect to the longitudinal axis X-X'. The front and rear faces 34a, 34b extend radially. In the illustrated example, the front face 34a is provided with three feet (not referenced) to accommodate the hole bottom imperfections.

The sensor holder 32 also comprises two opposite flexible arms 36, 38 mounted on the main body 34 and supporting opposite ends of the piezoelectric strain sensor 30. In this example, each arm 36, 38 extends from the main body 34. The piezoelectric strain sensor 30 is supported by the arms 36, 38 above the rear face 34b of the main body. There is no contact between the piezoelectric strain sensor 30 and the rear face 34b. Thus, the piezoelectric strain sensor 30 remains spaced apart from the rear face 34b. The piezoelectric strain sensor 30 is secured to the arms 36, 38 by any appropriate means, for example by gluing, clamping, etc. The piezoelectric strain sensor 30 lies in a plane parallel to the front face 34a of the main body.

Preferably, the arms 36, 38 are designed such that their bending stiffness is smaller than the bending stiffness of the piezoelectric strain sensor 30. The arms 36, 38 are symmetric with regard to a median plane containing the longitudinal axis X-X'. In the disclosed example, each arm 36, 38 is provided with an axial part 36a, 38a mounted on the main body 34 and flexible in the radial direction, and with a radial part 36b, 38b extending the axial part 36a, 38a and flexible in the axial direction.

The axial part 36a, 38a of each arm extends from the main body 34. In the disclosed example, the main body 34 is provided with two blind holes 40, 42 extending axially from the rear face 34b. The axial part 36a, respectively 38a, extends from the bottom of the blind hole 40, respectively 42. The axial part 36a, 38a of each arm remains spaced apart from the peripheral wall of the associated blind hole 40, 42. Each axial part 36a, 38a axially protrudes with respect to the rear face 34b of the main body.

The radial part 36b, 38b of each arm extends from the upper end of the axial part 36a, 38a. Each radial part 36b, 38b is axially located above the rear face 34b of the main body. Each radial part 36b, 38b remains spaced axially apart from the rear face 34b.

The sensor holder 32 is further provided with a central pin 44 which protrudes axially with regard to the front face 34a of the main body in a free state. For example, the central pin 44 protrudes axially 0.1 mm lower than feet of the front face 34. The lower end of the central pin 44 comes into contact with the bottom 24a (FIG. 1) of the blind hole of the inner ring.

The pin 44 also protrudes axially with regard to the rear face 34b of the main body. The pin 44 axially abuts onto the piezoelectric strain sensor 30. The upper end of the pin 44 abuts in the middle of the piezoelectric strain sensor 30. The pin 44 extends axially inside a through-hole 46 made in the thickness of the main body 34.

In the illustrated example, the pin 44 and the main body 34 are made in one part. Two opposite flexible radial arms 48, 50 are here provided between the pin 44 and the bore of the main body 34. The pin 44 is axially moveable with respect to the main body 34.

In the disclosed example, the main body 34, the arms 36, 38 and the pin 44 of the sensor holder are made in one part. Alternatively, the sensor holder could be built up out of multiple parts.

The piezoelectric strain sensor unit 18 also comprises an outer shell 52 secured to the main body 34 of the sensor holder and delimiting together with the main body a closed chamber 54 inside which are located the arms 36, 38 and the piezoelectric strain sensor 30. The outer shell 52 recovers the main body 34. The outer shell 52 is secured to the main body 34 by any appropriate means.

The piezoelectric strain sensor unit 18 further comprises an elastic compressing spring 56 exerting an axial pre-stressing permanent force on the piezoelectric strain sensor 30 so as to ensure an axial contact between the sensor and the pin 44 and allowing for any dip at centre of the bottom 24a (FIG. 1) of the blind hole of the inner ring. The spring 56 is mounted inside the chamber 54 defined between the outer shell 52 and main body 34.

In the disclosed example, the piezoelectric strain sensor unit 18 comprises a central stud 58 to center the spring 56 on the piezoelectric strain sensor 30. The stud 58 is secured to the piezoelectric strain sensor 30. The spring 56 is mounted around the stud 58. A first end of the spring 56 axially abuts against the outer shell 52, and a second end axially abuts against the stud 58. The spring 56 forms a pre-stressing element. Alternatively, it could be possible to provide other pre-stressing element to exert a permanent axial force on the piezoelectric strain sensor 30, for example elastic washers such as Belleville washers.

The strain sensor unit 18 further comprises a connector sleeve 58 intended to be fixed to the inner ring 10 (FIG. 1), and flexible bellows 60 axially interposed between the sleeve and the outer shell 52. Bellows 60 are secured to the sleeve 58 and to the outer shell 52. Through the bellows 60, the sensor holder 32 is always correctly aligned with the bottom 24a (FIG. 1) of the blind hole of the inner ring.

In use, the central pin 44 of the sensor holder is pushed up with regard to the axis X-X' as the bottom 24a (FIG. 1) of the hole of the inner ring deforms in response to increased load caused by the rolling elements 16 passing underneath. Deformation is transferred to the piezoelectric strain sensor 30 which in turn bends and provides a signal proportional to the dynamic deformation.

In the illustrated example, the blind hole 24 of the inner ring, inside which is mounted the piezoelectric strain sensor unit 18, is oriented axially with regard to the axis X-X' of the rolling bearing.

Alternatively, as shown on FIG. 3, in which identical parts are given identical references, the blind hole 24 of the inner ring may be oriented radially with regard to the axis X-X' of the rolling bearing. The blind hole 24 extends radially from the bore of the inner ring.

In the illustrated examples, only one strain sensor unit is mounted on the inner ring 10 to enable measuring rolling elements 16 load. It is also possible to provide one strain sensor unit for each row of rolling elements 14, 16.

As an alternative, it could also be possible to provide a reversed arrangement with the strain sensor unit(s) mounted on the outer ring.

In the described examples, the rolling bearing is provided with two rows of rolling elements. Alternatively, the rolling bearing may comprise only one row of rolling elements or three or more rows of rolling elements. In the illustrated example, the rolling elements are rollers. The rolling bearing may comprise other types of rolling elements, for example needles or balls.

What is claimed is:

1. A piezoelectric strain sensor unit configured for insertion into a ring of a rolling bearing, the ring defining a hole therein, a portion of the ring forming an end face which defines a distal end of the hole, a plurality of rolling elements being disposed on the ring, the piezoelectric strain sensor unit comprising:
   a piezoelectric strain sensor; and
   a sensor holder provided with a main body having a front face configured to contact the end face which defines a distal end of the hole, the main body having a rear face, wherein the piezoelectric strain sensor is positioned spaced from the rear face of the sensor holder;

a pin positioned in the main body and oriented along a pin axis which is perpendicular to the piezoelectric strain sensor, the pin have a first end and a second end, the first end being configured to contact the end face defined by the ring while the piezoelectric strain sensor unit is positioned in the ring, the second end being configured to abut against the piezoelectric strain sensor, the pin being moveable along the pin axis to abut the piezoelectric strain sensor with a force which is proportional to a load exerted on the plurality of rolling elements which deforms the ring.

2. The piezoelectric strain sensor unit of claim 1, the main body defining a recess which opens to the front face, the main body defining a recess sidewall and a recess base which is spaced from the front face, the main body further defining a through hole which extends between the recess base and the rear face so as to moveably locate the pin in the recess and through the main body.

3. The piezoelectric strain sensor unit of claim 2, when viewed in cross-section, a flexible member extends between the pin and the recess sidewall, the flexible member being positioned on the pin at a pin location positioned spaced from and between the first end and the second end, the flexible member being positioned on the recess sidewall at a sidewall location spaced from and between the recess base and the front face of the main body.

4. The piezoelectric strain sensor unit of claim 3, wherein the main body, the flexible member, and the pin are formed as a single, one-piece, unitary member.

5. The piezoelectric strain sensor unit of claim 4, wherein the main body has an outer connecting wall extending between the front face and the rear face, a shoulder being formed on the outer connecting wall and extending along a perimeter of the main body.

6. The piezoelectric strain sensor unit of claim 5, wherein the main body has an outer connecting wall extending between the front end and the rear end, a shoulder being formed on the outer connecting wall and extending along a perimeter of the main body.

7. The piezoelectric strain sensor unit of claim 6, further comprising an outer shell defining a cavity, the outer shell having a rim which defines a cavity opening, the outer shell being configured to receive a portion of the main body therein such that the rear face of the main body is located within the cavity and the rim is positioned against the shoulder.

8. The piezoelectric sensor strain unit of claim 7, wherein the outer shell and the main body form a chamber therebetween, the piezoelectric strain sensor being positioned in the chamber such that the piezoelectric strain sensor is spaced from and does not contact the main body and is also spaced from and does not contact the outer shell.

9. The piezoelectric strain sensor unit of claim 8, further comprising a flexible arm positioned between the piezoelectric strain sensor and the main body, the flexible arm having a first bending stiffness which is less than a second bending stiffness of the piezoelectric strain sensor.

10. The piezoelectric strain sensor unit of claim 9, further comprising a second flexible arm positioned between the piezoelectric strain sensor and the main body, the second flexible arm having the first bending stiffness.

11. The piezoelectric strain sensor unit of claim 8, further comprising a flexible arm positioned between the piezoelectric strain sensor and the main body, wherein the flexible arm, the and the pin are a single, one-piece, unitary member such that the sensor holder is not affected by temperature changes.

12. The piezoelectric strain sensor unit of claim 2, further comprising:

the main body has an outer connecting wall extending between the front face and the rear face, a shoulder being formed on the outer connecting wall and extending along a perimeter of the main body, the main body has an outer connecting wall extending between the front face and the rear face, a shoulder being formed on the outer connecting wall and extending along a perimeter of the main body; and an outer shell defining a cavity, the outer shell having a rim which defines a cavity opening, the outer shell being configured to receive a portion of the main body therein such that the rear face of the main body is located within the cavity and the rim is positioned against the shoulder, the outer shell and the main body form a chamber therebetween, the piezoelectric strain sensor being positioned in the chamber such that the piezoelectric strain sensor is spaced from and does not contact the main body and is also spaced from and does not contact the outer shell.

13. The piezoelectric strain sensor unit of claim 12, further comprising a flexible arm positioned between the piezoelectric strain sensor and the main body, the flexible arm having a first bending stiffness which is less than a second bending stiffness of the piezoelectric strain sensor.

14. The piezoelectric strain sensor unit of claim 13, further comprising a second flexible arm positioned between the piezoelectric strain sensor and the main body, the second flexible arm having the first bending stiffness.

15. The piezoelectric strain sensor unit of claim 12, further comprising a flexible arm positioned between the piezoelectric strain sensor and the main body, wherein the flexible arm, the main body, and the pin are a single, one-piece, unitary member such that the sensor holder is not affected by temperature changes.

16. The piezoelectric strain sensor unit of claim 12, wherein the front face of the main body is provided with at least three feet to position the sensor holder in contact with the end face of the hole in the ring.

17. The piezoelectric strain sensor unit of claim 12, further comprising a pre-stressing element located within the chamber, the pre-stressing element exerting a second force on the piezoelectric strain sensor to encourage contact between the piezoelectric strain sensor and the pin.

18. The piezoelectric strain sensor unit of claim 12, further comprising a connector sleeve configured to connect to the ring, a flexible bellows extending between the connector sleeve and the outer shell.

19. A combination ring for a bearing and a piezoelectric strain sensor unit of claim 12, wherein the end face of the hole, when viewed in cross section, is linear throughout an area which is configured for contact with the piezoelectric strain sensor unit.

20. The combination of claim 19, wherein when viewed in cross-section, the pin axis is askew to a central axis of each of the plurality of rolling elements.

* * * * *